US008010249B2

(12) United States Patent
Liebl et al.

(10) Patent No.: US 8,010,249 B2
(45) Date of Patent: Aug. 30, 2011

(54) VEHICLE DIAGNOSTIC DEVICE

(75) Inventors: Troy Liebl, Owatonna, MN (US); Manokar Chinnadurai, Owatonna, MN (US); Matthew Jordison, Blooming Prairie, MN (US)

(73) Assignee: SPX Corporation, Charlotte, NC (US)

( * ) Notice: Subject to any disclaimer, the term of this patent is extended or adjusted under 35 U.S.C. 154(b) by 0 days.

(21) Appl. No.: 12/891,224

(22) Filed: Sep. 27, 2010

(65) Prior Publication Data

US 2011/0015822 A1 Jan. 20, 2011

Related U.S. Application Data

(63) Continuation of application No. 10/921,190, filed on Aug. 19, 2004, now Pat. No. 7,805,228.

(51) Int. Cl.
*G06F 19/00* (2006.01)
*G06F 7/00* (2006.01)

(52) U.S. Cl. ............................... 701/35; 701/29; 701/33

(58) Field of Classification Search ........................ None
See application file for complete search history.

(56) References Cited

U.S. PATENT DOCUMENTS

| | | | |
|---|---|---|---|
| 2,640,968 | A | 6/1953 | Lehr |
| 3,627,929 | A | 12/1971 | Gilissen et al. |
| 4,294,039 | A | 10/1981 | Dalheimer et al. |
| 4,392,661 | A | 7/1983 | Langenstein |
| 4,924,039 | A | 5/1990 | McAllise et al. |
| D322,582 | S | 12/1991 | Friedman |
| 5,473,540 | A | 12/1995 | Schmitz |
| 5,491,418 | A | 2/1996 | Alfaro et al. |
| 5,687,081 | A | 11/1997 | Wellman et al. |
| 5,916,286 | A | 6/1999 | Seashore et al. |
| 5,916,287 | A | 6/1999 | Arjomand et al. |
| 5,936,315 | A | 8/1999 | Lais |
| 6,094,609 | A | 7/2000 | Arjomand |
| 6,169,943 | B1 | 1/2001 | Simon et al. |
| 6,360,145 | B1 * | 3/2002 | Robinson ........................ 701/35 |
| 6,362,421 | B1 | 3/2002 | Layton, Jr. |
| 6,393,342 | B2 | 5/2002 | Bauer et al. |
| 6,405,112 | B1 | 6/2002 | Rayner |
| 6,438,472 | B1 | 8/2002 | Tano et al. |
| 6,462,270 | B1 | 10/2002 | Depp et al. |
| 6,476,320 | B1 | 11/2002 | Ritter et al. |
| 6,515,226 | B2 | 2/2003 | Chiriku et al. |
| 6,539,358 | B1 | 3/2003 | Coon et al. |
| 6,586,674 | B2 | 7/2003 | Krause et al. |
| 6,633,482 | B2 | 10/2003 | Rode |
| 6,687,584 | B2 * | 2/2004 | Andreasen et al. ............. 701/29 |
| 6,693,367 | B1 * | 2/2004 | Schmeisser et al. ........... 307/9.1 |
| 6,728,603 | B2 | 4/2004 | Pruzan et al. |
| 6,745,151 | B2 | 6/2004 | Marko et al. |
| 6,757,600 | B2 | 6/2004 | Bachle |
| 6,799,101 | B2 | 9/2004 | Hawig et al. |
| 6,807,469 | B2 | 10/2004 | Funkhouser et al. |
| 6,816,760 | B1 | 11/2004 | Namaky |

(Continued)

*Primary Examiner* — Khoi Tran
*Assistant Examiner* — Ian Jen
(74) *Attorney, Agent, or Firm* — Baker & Hostetler LLP

(57) ABSTRACT

An apparatus and method is provided that allows a user to record events in a vehicle via a vehicle data recorder in the latest communication protocols, such as Controller Area Network. The vehicle data recorder can record data from the event when a trigger button is actuated by the user and the CAN communication can be controlled by the CAN controller. After the data is recorded, it can transferred to a host workstation, where the user can analyze the data from the event and diagnose the problem causing the event.

16 Claims, 3 Drawing Sheets

U.S. PATENT DOCUMENTS

| | | | | |
|---|---|---|---|---|
| 6,818,760 | B1 * | 11/2004 | Spicer et al. | 536/25.4 |
| 6,823,243 | B2 | 11/2004 | Chinnadurai et al. | |
| 6,832,141 | B2 | 12/2004 | Skeen et al. | |
| 6,847,871 | B2 | 1/2005 | Malik et al. | |
| 6,847,916 | B1 | 1/2005 | Ying | |
| 6,848,916 | B2 | 2/2005 | Nakayama et al. | |
| 6,859,696 | B2 | 2/2005 | Schade et al. | |
| 6,881,899 | B1 | 4/2005 | Trangsrud | |
| 6,904,586 | B1 | 6/2005 | Bemanian et al. | |
| 6,907,445 | B2 | 6/2005 | Pellegrino et al. | |
| 6,916,985 | B1 | 7/2005 | Harwood | |
| 6,937,926 | B2 | 8/2005 | Lipscomb et al. | |
| D510,044 | S | 9/2005 | Ribeiro et al. | |
| D510,045 | S | 9/2005 | Lipscomb et al. | |
| 6,939,155 | B2 | 9/2005 | Postrel | |
| 6,941,203 | B2 | 9/2005 | Chen | |
| 6,957,133 | B1 | 10/2005 | Hunt et al. | |
| 6,993,421 | B2 * | 1/2006 | Pillar et al. | 701/33 |
| D518,394 | S | 4/2006 | Lipscomb et al. | |
| D519,046 | S | 4/2006 | Lipscomb et al. | |
| D519,859 | S | 5/2006 | Chinnadurai et al. | |
| 7,054,727 | B2 | 5/2006 | Kemp et al. | |
| 7,058,488 | B2 | 6/2006 | Kemp et al. | |
| 7,079,927 | B1 | 7/2006 | Tano et al. | |
| 7,091,440 | B2 | 8/2006 | Gabbianelli et al. | |
| 7,099,750 | B2 | 8/2006 | Miyazawa et al. | |
| 7,113,127 | B1 | 9/2006 | Banet et al. | |
| 7,117,984 | B2 | 10/2006 | Jordison et al. | |
| 7,149,612 | B2 | 12/2006 | Stefani et al. | |
| 7,155,321 | B2 | 12/2006 | Bromley et al. | |
| 7,155,322 | B2 | 12/2006 | Nakahara et al. | |
| 7,208,685 | B2 | 4/2007 | Browning et al. | |
| 7,224,262 | B2 | 5/2007 | Simon et al. | |
| 7,239,945 | B2 | 7/2007 | Hiemer et al. | |
| 7,302,314 | B2 | 11/2007 | Sommer | |
| 7,305,289 | B2 | 12/2007 | Gessner et al. | |
| 7,430,465 | B2 | 9/2008 | Liebl et al. | |
| 2002/0007237 | A1 | 1/2002 | Phung et al. | |
| 2003/0158640 | A1 * | 8/2003 | Pillar et al. | 701/33 |
| 2003/0182033 | A1 | 9/2003 | Underdahl et al. | |
| 2005/0096809 | A1 | 5/2005 | Skeen et al. | |
| 2005/0107929 | A1 | 5/2005 | Haydn | |
| 2006/0041347 | A1 | 2/2006 | Chinnadurai et al. | |

* cited by examiner

VEHICLE DIAGNOSTIC DEVICE

CROSS-REFERENCE TO RELATED APPLICATIONS

This application claims priority to and is a continuation of U.S. patent application entitled "Vehicle Diagnostic Device," filed Aug. 19, 2004, now U.S. Pat. No. 7,805,228 having Ser. No. 10/921,190, the disclosure of which is hereby incorporated by reference in its entirety.

FIELD OF THE INVENTION

The present invention relates generally to an apparatus and method for diagnosing events in a vehicle. More particularly, the present invention relates to an apparatus, such a Vehicle Data Recorder (VDR) and method that record events in a vehicle that can communicate with a Controller Area Network (CAN).

BACKGROUND OF THE INVENTION

When a problem arises in a vehicle, such as an automobile, the owner takes the automobile to a service station or a garage for a mechanic to diagnose the problem. If the problem occurs frequently or occurs at the service station, then the mechanic can diagnose the problem with the diagnostic tools on site. However, the problem can be intermittent and may not occur when the vehicle is at the service station, thus the mechanic may not be able to diagnose the problem. If the mechanic cannot diagnose the problem while the vehicle is at the service station, the owner can become frustrated because the problem still exists and he has taken time off from work in order to bring the vehicle for service. Further, the owner will have to take additional time off to bring the vehicle back for servicing when the intermittent problem occurs again. This scenario can be repeated many times before the problem is properly diagnosed.

An intermittent problem or event may be a spark plug in one of the vehicle's cylinder that does not fire properly when the vehicle hits a bump in the road at certain speeds causing the vehicle to lose power. The event does not occur every time the vehicle hits a bump, but does occur enough that the owner is frustrated. Further, should the intermittent problem occur when the vehicle is in the middle of an intersection, the driver may cause an accident due to loss of power during acceleration across a crowded intersection. However, since the event may not be recreated at the service station or when the mechanic takes the vehicle for a test drive, it will be difficult for the mechanic to diagnose the problem.

A vehicle data recorder (VDR) has been available to record such events when they occur. The VDR is a self-contained modular unit that easily connected to a vehicle. It will monitor and record diagnostic data from the vehicle's computer (Electronic Control Unit or ECU) so that when the event occurs, the data from the event can be recorded and later viewed by the user. Once the data from the event is recorded by the VDR, the mechanic can download the data into a host workstation and diagnose the problem.

The current VDR, however, has not kept up with new communication protocols that exist in new vehicles, such as CAN. Thus, a mechanic could not use a standard VDR in a vehicle that communicates via CAN.

Accordingly, it is desirable to provide an apparatus and method that can diagnose events in a vehicle, such as VDR that can communicate with all communication protocols including CAN.

SUMMARY OF THE INVENTION

The foregoing needs are met, to a great extent, by the present invention, wherein one aspect of an apparatus is provided that in some embodiments includes a VDR that communicates in CAN communication protocol with a vehicle's computer.

In accordance with one embodiment of the present invention, a vehicle data recorder is provided and can include a first a first connector that communicates with a vehicle's computer and relays data to and from a vehicle, a processor that controls the vehicle data recorder functions, a memory in communication with the processor to store recorded data, a communication protocol controller in communication with the processor, a second connector that communicates with a host workstation to transfer the recorded data from the vehicle data recorder to the host workstation, a trigger button to initiate data recording by the vehicle data recorder, the trigger button communicates with the processor and is positioned at an end of a housing of the vehicle data recorder, an option card in communication with the communication protocol controller and configured to enable the vehicle data recorder to support new communication protocols through additional connections, and a power source connector for receiving an external power to power the vehicle data recorder and to the option card.

In accordance with another embodiment of the present invention, a method of communicating data from a vehicle is provided and can include connecting a first connector of a vehicle data recorder to a vehicle's computer, communicating with the vehicle via a vehicle communication protocol controller, automatically recording data from an event without the user actuating a trigger button, and receiving external power to the vehicle data recorder and to the option card via a power source connector.

In accordance with yet another embodiment of the present invention, a vehicle data recorder system is provided and can include a first connecting means that communicates with a vehicle's computer and relays data to and from a vehicle, a processing means that controls the vehicle data recorder functions, a memory means in communication with the processing means to store recorded data, a communication protocol controlling means in communication with the processing means, a second connector means that communicates with a host workstation to transfer the recorded data from the vehicle data recorder to the host workstation, a triggering means to initiate data recording by the vehicle data recorder, the triggering means communicates with the processing means and is positioned at an end of a housing of the vehicle data recorder, an option card in communication with the communication protocol controlling means and configured to enable the vehicle data recorder to support new communication protocols through additional connections, and a power source connecting means for receiving an external power to power the vehicle data recorder and to the option card.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
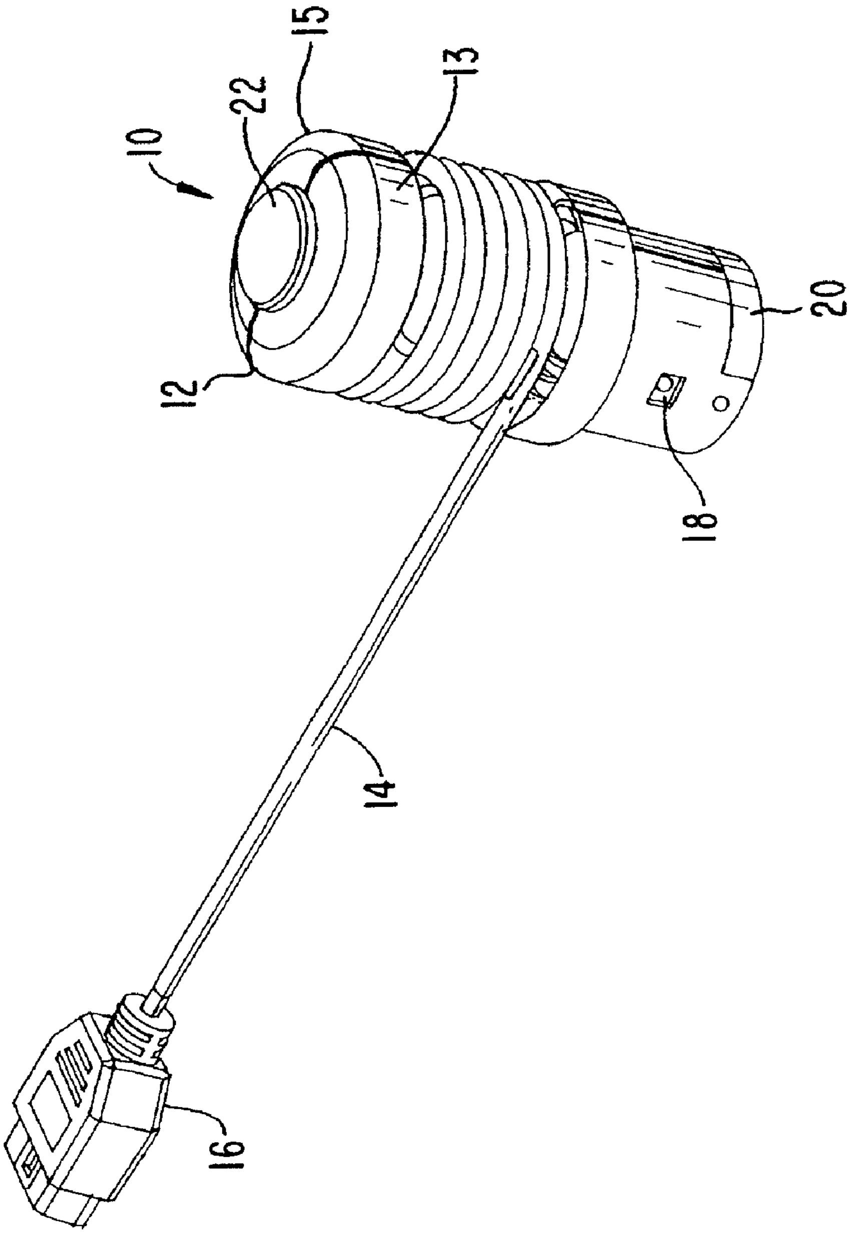
FIG. 1 is a perspective view of a VDR capable of CAN communication according to a preferred embodiment of the invention.

The invention will now be described with reference to the drawing figures, in which like reference numerals refer to like parts throughout. An embodiment in accordance with the present invention provides a VDR that can communicate in the latest communication protocols including CAN via their associated hardware in a vehicle.

CAN is a serial bus system, which was originally developed for automotive applications and is suited for networking devices such as sensors, and actuators. Protocols of CAN include Dual-Wire high (nominal transmission rate of 500 kilobits per second or kbps) and medium speed (nominal transmission rate of 95.24 kbps) and Single-Wire normal mode (nominal transmission rate at 33.33 kbps and high speed mode (nominal transmission rate at 83.33 kbps). CAN is used in applications, such as transmissions, power windows, lights, power steering and instrument panels. A CAN transmitter can send a packet or a message with an identifier to all CAN nodes in the vehicle and each node can determine, based on the identifier, whether it should process the packet. The identifier can also determine the priority the message receives while using the bus. If two messages are sent by two difference devices at the same time to the bus, the device with the lower priority identifier will yield to the higher priority identifier until the higher priority identifier message is completed. After the higher priority message is sent, then the lower priority message will have access to the bus. Thus, the message is not lost and is determinant. CAN advantages include a high degree of flexibility since CAN nodes can be added without change to software or hardware and all nodes can be simultaneously communicated with.

An embodiment of the present inventive apparatus and method is illustrated in FIG. 1, which is a perspective view of a VDR 10 capable of CAN communication. VDR 10 includes a housing 12, an integrated vehicle I/O cable 14 with a J1962 male connector 16 to communicate with the vehicle's computer (ECU), a power connector 18, a communication port (not shown), a cover 20 that covers an optional card connector and a trigger button 22 with LED illumination.

The housing 12 covers the internal components (described below) and can include a first 13 and second parts 15 for easy assembly. The housing 12 can be any shape but is preferably cylindrical in shape. The trigger button 22 is located on the top portion of the VDR and can be any shape, but preferably is cylindrical in shape. The trigger button 22 when depressed will cause the VDR to record the vehicle data information so that the data related to the event can be captured. The VDR can be programmed to record data for a period of time before and after the trigger button 22 is depressed, record data for a period of time without the user's intervention, record only when the trigger button is actuated and stops recording when the trigger button again actuated, record for any other time period desired by the user, and a combination thereof. The data can be uploaded later to the host workstation for the user to review the data from the event. The trigger button 22 can be illuminated by LED so that it can be used in dark environmental conditions. The LED can remain steady so that the user can easily locate the VDR in the dark and can be flashing when the event data is being recorded. It will be recognized by a person skilled in the art that the trigger button 22 can be located anywhere on the outside surface of the VDR including the sides and the bottom.

The cable 14 with the J1962 male connector 16 provide communication between the ECU and the VDR. The cable 14 can be any length so long as its length is long enough for the user to connect the VDR to the ECU. When not in use, the cable can be wrapped around the housing 12 for easy storage. The J1962 male connector 16 connects to its complementary female connector on the ECU. The J1962 male connector 16 allows the VDR to collect data from the ECU in various communication protocols, including CAN.

The power connector 18 is used when the VDR is not connected to the vehicle and the data contained therein is being downloaded to the host workstation. The host workstation can be any computing device, such as a computer, personal digital assistant (PDA) or a scan tool. The information from the VDR can be downloaded to the host workstation via the communication port, which can include a RJ-45 jack.

The cover 20 covers the optional card connector (discussed below). The cover 20 is removably attached for easy access to the optional card connector. The optional card can update and add software, other information and hardware to the VDR.

Figure 2:
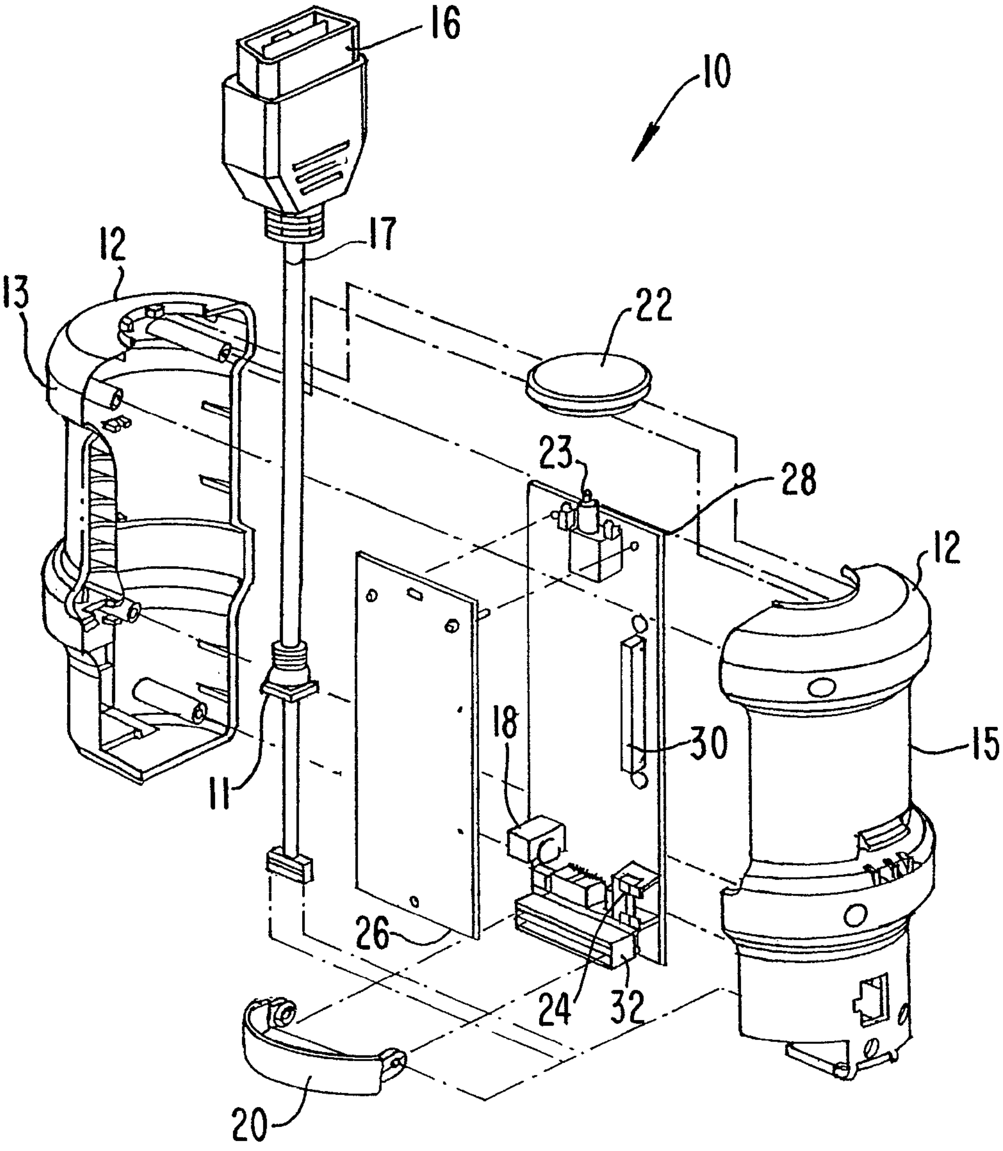
FIG. 2 is the exploded view of the VDR's external and internal components according to one embodiment of the present invention.

FIG. 2 is the exploded view of the VDR's 10 external and internal components according to one embodiment of the present invention. The internal components are contained in the housing 12, which includes the first 13 and second 15 parts. The first part 13 includes an opening for the power connector 18 to connect to an external power source. When the VDR is used in the vehicle, it can be powered by the battery of the vehicle via the J1962 male connector 16 and when the data from the VDR is being downloaded to the host workstation, the external power source is utilized or when needed by the user. The second part 15 includes an opening for the communication port 24 so that the data from the VDR can be downloaded to the host workstation. The first 13 and second 15 parts have a top portion that receives the trigger button 22 and a bottom portion that receives the cover 20.

The cable 14 includes a first end 11 that is connected to a main board 28 and a second end 17 that is connected to the J1962 male connector 16. The J1962 male connector 16 connects to its complementary female connector on the vehicle's ECU. The J1962 male connector 16 includes various pins that can communicate with various communication protocols in a vehicle.

The main board 28 and a second board 26 are coupled together and communicate with each other via a high density board-to-board connector 30. The main board 28 and the second board 26 can also be coupled together by pins. The main board 28 includes a vehicle I/O, a real-time clock, the power connector 18, a trigger switch 23, and other interface connectors, such as the optional card connector 32, and the communication port 24. The optional card connector 32 connections with an option card (discussed below), which can be used to update the VDR with new communication protocols, pin assignments, software, hardware, and configurations for a Field Programmable Gate Array (FPGA), discussed below.

The trigger switch 23 is actuated by the user when he depresses the trigger button 22 and data from the vehicle is recorded. The second board 26 contains the processor, memory, and protocol controllers (discussed below). Although three cards (main and second boards and option card) are discussed herein, one skilled in the art will recognize that additional cards and components or less cards and components are possible depending on the needs of the user.

Figure 3:
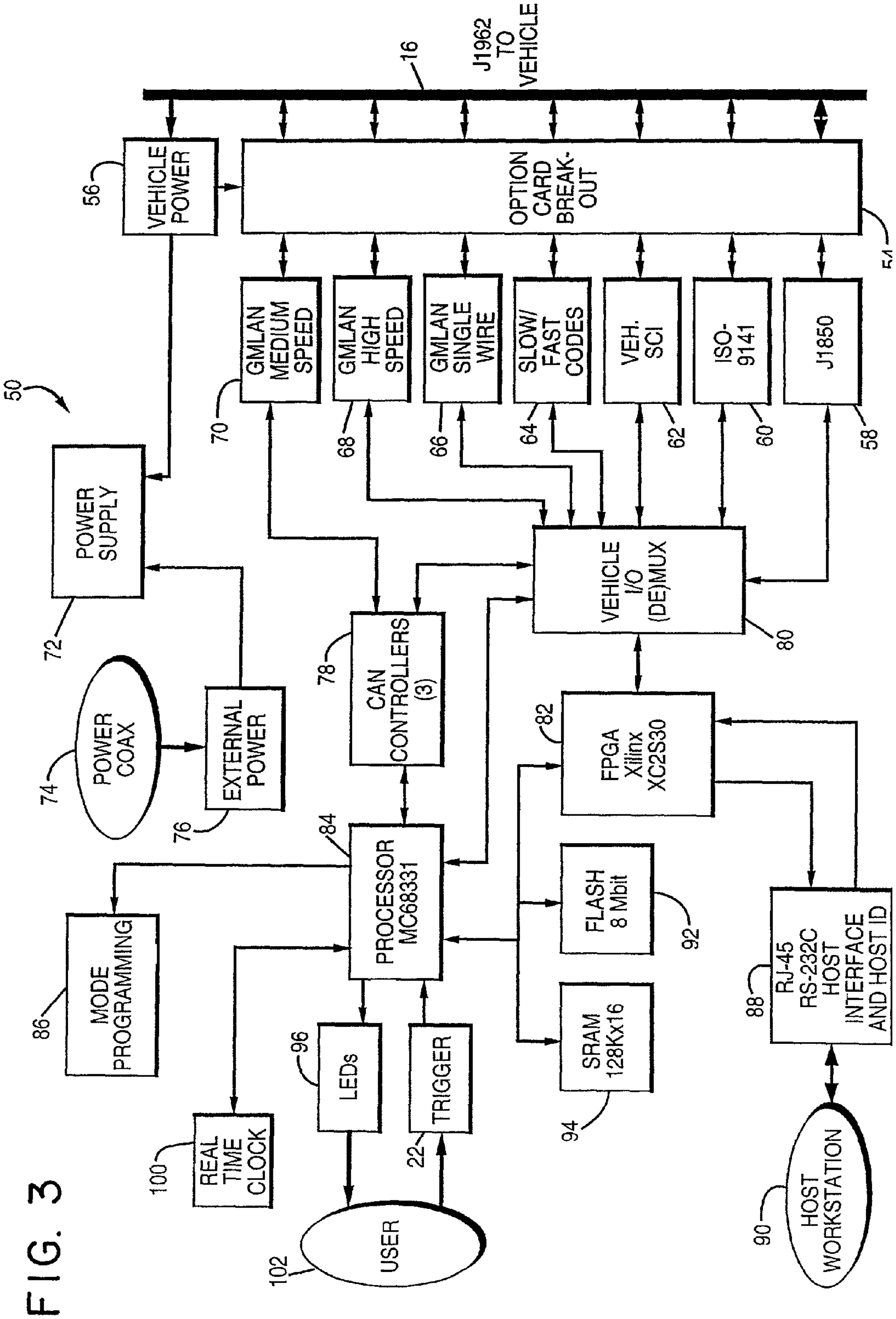
FIG. 3 is a functional block diagram of an embodiment of the VDR.

FIG. 3 is a functional block diagram 50 of an embodiment of the VDR. The J1962 male connector 16 can be connected to the ECU so that the VDR can collect diagnostic data from the vehicle. The J1962 male connector 16 includes various pins that mate with complementary pins in the ECU. The pins relay communication protocols that carry diagnostic data and instructions to and from the vehicle. The pins are assigned depending on the communication protocol of the vehicle and are known in the art.

The option card 54 provides flexibility to the VDR by allowing the VDR to support new communication protocols, pin assignments, software, information, hardware, and configure the FPGA. Additionally, the option card 54 can also act to simply pass through the communication protocols, if desired. All communication protocols hardware circuits 58, 60, 62, 64, 66, 68, 70 can communicate with the option card 54. The option card allows flexibility for pin swapping, pin reconfiguration or additional pins to adapt to various current and new communication protocols. A multiplexer can be added to provide additional circuits for signal communication.

The VDR and the option card 54 can be supplied with power via vehicle power 56 and this allows the option card 54 to have active components thereon. Active components include new protocol transceivers to communicate in the new communication protocols. Additional processor 84, FPGA 82, memories 92, 94, can be added to the VDR via the option card 54 to increase processing power and memory storage. Should additional power is needed for the VDR and its components, additional power supply and conditioners can also be added with the option card 54.

Wired data transfer ports (serial, parallel, USB (Universal Serial Bus), Fire Wire (IEEE 1394) and others) and wireless data transfer ports for wireless communication (Wi-Fi, BLUE TOOTH, Infrared, Radio Frequency and other wireless communication protocols) can also be added to the VDR via the option card 54. The option card 54 can include the appropriate wireless communication transmitters and receivers thereon so that wireless communication can occur.

Software updates can be added to the memories, the processor 84 and FPGA 82 such as new firmware, software to communicate with new communication protocols, software to run new hardware, software to reconfigure the FPGA, software to update mode programming or new procedures. It will be recognized by a person skilled in the art that additional hardware and software can be added in the future without departing from the scope of the option card 54. The option card 54 is inserted into the option card connector 32 and can be protected by the cover 30. To replace the option card 54 with a new option card, the cover 30 can be removed and the old option card can be removed and a new one inserted. Once completed, the cover 30 can be left off or reattached to the VDR.

When the VDR is being used in the vehicle, it can be powered by the vehicle power 56 that supplies power to a power supply 72. The vehicle power 56 can be provided through the J1962 male connector 16 when it's hooked up to the vehicle's computer. Alternatively, power coax 74 can be used to supply external power 76 to the power supply 72 when the VDR is outside of the vehicle, such as when it is downloading event data to the host workstation or as otherwise needed by the user.

The communication protocols and hardware include J1850 (58), ISO 9141 (60), Vehicle SCI 62 (Serial Communication Interface), Slow/Fast Codes 64, GMLAN Single Wire 66, GMLAN high speed 68, and GMLAN medium speed 70. The J1850 (58) is a multiplexed communication protocol that can be further divided into Variable Pulse Width (VPW) and Pulse Width Modulation (PWM). PWM typical communication speed is about 41.6 kbps and is a two wire balanced signal, while VPW typical communication speed is about 10.4 kbps and is a one signal wire. This protocol is used for diagnostic and data sharing purposes and can be found in engine, transmission, ABS, and instrumentation applications.

ISO 9141 (60) is either a single wire (K line only) or a two wire (K and L line). The K line is bi-directional and conveys address information and data with the ECU. The L line is unidirectional and is only used during initialization with the ECU. This protocol is implemented on 1996 and newer vehicles.

GMLAN is a family of serial communication buses that allows ECUs to communicate with each other or with a diagnostic tester. There are three types of buses, a dual wire high speed bus (GMLAN high speed) 68, a dual wire medium speed bus (GMLAN medium speed) 70, and a single wire low speed bus (GMLAN single wire) 66. The GMLAN high speed 68 (500 kbps) is typically used for sharing real time data such as driver commanded torque, actual engine torque, steering angle, etc. The GMLAN medium speed 70 (up to 250 kbps) is typically used for applications (display, navigation, etc.) where the system's response time demands that a large amount of data be transmitted in a relatively short amount of time, such as updating a graphics display. The GMLAN single wire 66 (33.33 kbps) is typically used for operator controlled functions where the system's response time requirements are in the order of 100-200 msecs. This bus also supports high speed operation at 83.33 kbps used only during ECU reprogramming. The decision to use a particular bus in a given vehicle depends upon how the feature/functions are partitioned among the different ECUs in that vehicle. GMLAN buses use the CAN communications protocol for relaying information.

Slow/Fast Codes can be found in GM vehicles and is a serial communication protocol. Some examples include GM Dual Baud, GM10, GM30, Master, Normal, Unidirectional and others. The serial baud transmission rate can be about 160 kbps to about 9600 kbps for Fast Codes. Slow Codes are used by grounding a Slow Code diagnostic pin in the vehicle diagnostic connector of the ECU, which forces the vehicle to display error codes via the check engine light. The user counts the number of blinks of the check engine light to represent an error code and decipher the code with a code manual.

Vehicle SCI 62 allows communication of data in a one-wire serial method between the tool and the ECU. The transmission rate is about 62.5 kbps. GM vehicles through 1995 use the UART (Universal Asynchronous Receiver/Transmitter is responsible for performing the main task in serial communications with computers), which makes use of this Vehicle SCI 62.

Certain vehicle I/O pins support multiple protocols and signals and must be passed through a Vehicle I/O 80 for proper routing, which includes MUX/DEMUX. Because vehicle manufacturers can assign different communication protocol signals on the same pin, the Vehicle I/O 80 processes the signal and routes the signal to the proper communication protocol processors. The proper routing configurations can be controlled through a microprocessor 84 (see below). The Vehicle I/O 80 is capable of communicating in the various communication protocol.

CAN controller 78 controls the CAN communication protocols discussed above. There can be three separate CAN controllers 78 (High and Medium Speed and Single Wire) in the VDR. With three CAN controllers 78, the different CAN protocols can be better routed to proper CAN controller for faster information receiving and transmitting than with just one CAN controller 78. The CAN controller 78 communicates with the Vehicle I/O 80 and the processor 84. A person skilled in the art will recognize that there can be one, two or any amount of CAN controller 78 on the VDR as desired.

The processor 84 can be any processor that has enough processing power that is required by the VDR. Preferably, the processor 84 is the MOTOROLA MC68331. The processor 84 has the ability to provide mode programming 86, which can program the ECU by connecting different load resistors to a mode pin. The trigger button 22 is in communication with the processor 84 so that the processor can control the data gathering for the VDR. The trigger button 22 can be illuminated by the LED 96 and actuated by user 102.

Additionally, the processor 84 communicates with a real time clock 100, which retains time and date information without the need of external power. The real time clock 100 is part of the main board 28. It would be recognized by a person skilled in the art that the real time clock 100 can be integrated with the processor 84 or separate from it. Memory such as Flash 92 (boot, program, record) and SRAM 94 are provided to the processor 84 so that information can be loaded into the processor or FPGA 82 or the information can be stored for later retrieval.

The processor 84 also communicates with the FPGA 82. Although any FPGA can be used, an XILINX XC2S30 may be utilized. The FPGA 82 is a specially made digital semiconductor that can be used as a programmable logic device that can emulate new electrical circuits as needed by the user. By incorporating the FPGA 82, the VDR can be updated with new circuits without the need of providing the actual new circuits on the boards or replacing the current boards on the VDR. The FPGA 82 versatility can be used to provide new circuits for new communication protocols or other needs.

The FPGA 82 is also in communication with RJ-45 (88) with RS-232C, which provides serial communication with the host workstation 90. The host workstation 90 receives the information recorded by the VDR so that events can be analyzed.

In operation, the VDR is connected to the ECU via the J1962 male connector. The VDR is powered by the battery in the vehicle through the connection of the ECU with the J1962 male connector. Once connected, the VDR is ready to record events in the vehicle. Depending on how the VDR is programmed to operate, the VDR can to record data for a period of time before and after the trigger button is depressed, record data for a period of time without the user's intervention, record only when the trigger button is actuated and stops recording when the trigger button again actuated, record for any other time period desired by the user, and a combination thereof. By recording before and after the trigger button 22 is depressed, the user can have a better sense of what is occurring in the vehicle before and after the event. If the VDR is programmed to record automatically, the user can pay attention to other aspects of the vehicle when the event occurs that can not be recorded by the VDR and can pay attention to driving the vehicle. Additionally, because the VDR can be automatically recording, if the event occurs quickly it can be recorded without having the user actuating the trigger button. By having the user manually actuating the trigger button to record the event, multiple event data can be recorded from the ECU because more memory is available. If the vehicle is equipped with CAN, then data from the ECU can be transmitted through the option card (if present) to the proper communication hardware. In this case, the CAN is relayed through GMLAN 66, 68 and 70 depending on the CAN protocol. The vehicle I/O may be needed if the same pin is being used to convey different communication protocols. The CAN controller also controls the CAN communication. The data being gathered can be stored in flash memory or other memory chips in the VDR. The data can later be downloaded to the host station via RJ-45 serial connection to the host workstation and analyzed.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A vehicle data recorder, comprising:

a first connector that communicates with a vehicle's computer and relays data to and from a vehicle;

a processor that controls the vehicle data recorder functions;

a memory in communication with the processor to store recorded data;

a communication protocol controller in communication with the processor;

a second connector that communicates with a host workstation to transfer the recorded data from the vehicle data recorder to the host workstation;

a trigger button to initiate data recording by the vehicle data recorder, the trigger button communicates with the processor and is positioned at an end of a housing of the vehicle data recorder;

an option card in communication with the communication protocol controller and configured to enable the vehicle data recorder to support new communication protocols through additional connections;

a field programmable gate array (FPGA) that simulate circuits and communicates with the processor and memory, wherein the option card is configured to update configurations of the FPGA;

a vehicle I/O that controls different communication protocols and communicates with the processor; and a power source connector for receiving an external power to power the vehicle data recorder and the option card.

2. The vehicle data recorder of claim 1, further comprising:

a first board having the vehicle I/O, a real time clock and at least one interface connector; and a second board having the processor, the FPGA, the memory and the communication protocol controller.

3. The vehicle data recorder of claim 1, wherein the first connector is a J1962 male connector.

4. The vehicle data recorder of claim 1, the trigger button is also configured to stop recording of vehicle data.

5. The vehicle data recorder of claim 1, wherein the communication protocol controller controls communication hardware selected from a group consisting of J1850, UART, ISO 9141, GMLAN, Vehicle SCI and other communication protocol hardware.

6. The vehicle data recorder of claim 1, wherein the vehicle data recording is initiated automatically.

7. The vehicle data recorder of claim 1 further comprising the trigger button having a LED incorporated therein.

8. The vehicle data recorder of claim 1, wherein the host workstation is a computing device that is one of a personal computer, a personal digital assistant and a scan tool.

9. A method of communicating data from a vehicle, comprising:

connecting a first connector of a vehicle data recorder to a vehicle's computer;

communicating with the vehicle via a vehicle communication protocol controller;

automatically recording data from an event without a user actuating a trigger button;

communicating with a remote computer via a wireless connection, wherein the wireless connection is supplied by an option card connected to the vehicle data recorder;

receiving external power to the vehicle data recorder and to the option card via a power source connector; and simulating circuits and communications with a processor and a memory via a field programmable gate array (FPGA), wherein the option card is configured to update configurations of the FPGA.

10. The method of communicating of claim 9, further comprising:

connecting a second connector to a host workstation; and transferring the data from the event to the host workstation for analysis by the user.

11. The method of communicating of claim 9, wherein communicating with the vehicle is further done with a vehicle I/O, and the processor.

12. The method of communicating of claim 9 further comprising of analyzing the data from the event to diagnose the problem in the vehicle.

13. A vehicle data recorder system, comprising:

a first means for connecting that communicates with a vehicle's computer and relays data to and from a vehicle;

a means for processing that controls the vehicle data recorder functions;

a means for storing recorded data in communication with the means for processing;

a means for controlling communication protocol in communication with the means for processing;

a second means for connecting with a host workstation to transfer the recorded data from the vehicle data recorder to the host workstation;

a means for triggering to initiate data recording by the vehicle data recorder, the means for triggering communicates with the means for processing and is positioned at an end of a housing of the vehicle data recorder;

an option card in communication with the means for controlling communication protocol and configured to enable the vehicle data recorder to support new communication protocols through additional connections;

a field programmable gate array (FPGA) that simulate circuits and communicates with the means for processing and means for storing, wherein the option card is configured to update configurations of the FPGA;

a vehicle I/O that controls different communication protocols and communicates with means for processing; and a means for powering that receives an external power to power the vehicle data recorder and the option card.

14. The vehicle data recorder system of claim 13 further comprising:

a first means for holding the vehicle I/O, a real time clock and at least one means for connecting; and a second means for holding the means for processing, the FPGA, the means for storing and the means for controlling communication protocol.

15. The vehicle data recorder system of claim 13, wherein the first means for connecting is a J1962 male connector.

16. The vehicle data recorder system of claim 13, wherein the means for controlling communication protocol is controlling communication hardware selected from a group consisting of J1850, UART, ISO 9141, GMLAN, Vehicle SCI and other communication protocol hardware.

* * * * *